(12) United States Patent
Kido et al.

(10) Patent No.: US 10,247,551 B2
(45) Date of Patent: Apr. 2, 2019

(54) VEHICLE IMAGE PROCESSING DEVICE FOR ENVIRONMENT RECOGNITION

(71) Applicant: HITACHI AUTOMOTIVE SYSTEMS, LTD., Hitachinaka-shi, Ibaraki (JP)

(72) Inventors: Hideaki Kido, Hitachinaka (JP); Haruki Matono, Tokyo (JP); Takeshi Nagasaki, Hitachinaka (JP); Shinji Kakegawa, Tokyo (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 182 days.

(21) Appl. No.: 15/500,127

(22) PCT Filed: Aug. 17, 2015

(86) PCT No.: PCT/JP2015/072987
§ 371 (c)(1),
(2) Date: Jan. 30, 2017

(87) PCT Pub. No.: WO2016/039077
PCT Pub. Date: Mar. 17, 2016

(65) Prior Publication Data
US 2018/0321030 A1 Nov. 8, 2018

(30) Foreign Application Priority Data
Sep. 11, 2014 (JP) .................................. 2014-185577

(51) Int. Cl.
*G01C 3/00* (2006.01)
*G01C 3/08* (2006.01)
(Continued)

(52) U.S. Cl.
CPC ............... *G01C 3/085* (2013.01); *G01C 3/00* (2013.01); *G06K 9/00791* (2013.01);
(Continued)

(58) Field of Classification Search
None
See application file for complete search history.

(56) References Cited

U.S. PATENT DOCUMENTS

| 6,950,550 B1 | 9/2005 | Sumi et al. |
| 2012/0236125 A1* | 9/2012 | Umezawa ............... G01C 3/085 348/47 |
| 2013/0182906 A1 | 7/2013 | Kojo et al. |

FOREIGN PATENT DOCUMENTS

| CN | 103154666 A | 6/2013 |
| JP | 2002-024807 A | 1/2002 |

(Continued)

OTHER PUBLICATIONS

Extended European Search Report dated Apr. 13, 2018 for the European Patent Application No. 15839643.2.
(Continued)

*Primary Examiner* — Idowu O Osifade
(74) *Attorney, Agent, or Firm* — Volpe and Koenig, P.C.

(57) ABSTRACT

Provided is an image processing device capable of maintaining recognition accuracy for distance, and the like, while meeting conflicting demands such as suppressing the response delay from image input from a camera to calculation result output, enhancing recognition accuracy, reducing calculation load (enhancing processing efficiency), and enhancing response speed. The time of the starting of the processing (S105) of a first distance calculation unit (105) for calculating the relative distance to an object on the basis of current position information determined on the basis of a left or right image and past position information for the object is set to an earlier time than the ending of the
(Continued)

processing (S107) of an object detection unit (107) for determining current position information for an object on the basis of parallax information obtained from the left and right images and detecting the object.

11 Claims, 9 Drawing Sheets

(51) Int. Cl.
*G06K 9/00* (2006.01)
*G06T 7/73* (2017.01)
*G06T 7/246* (2017.01)
*G06T 7/593* (2017.01)
*H04N 13/239* (2018.01)

(52) U.S. Cl.
CPC .............. *G06T 7/248* (2017.01); *G06T 7/593* (2017.01); *G06T 7/74* (2017.01); *G06T 2207/10012* (2013.01); *G06T 2207/30252* (2013.01); *H04N 13/239* (2018.05)

(56) References Cited

FOREIGN PATENT DOCUMENTS

| | | |
|---|---|---|
| JP | 2003-061075 A | 2/2003 |
| JP | 2008-236642 A | 10/2008 |
| JP | 2013-104740 A | 5/2013 |
| WO | 2013/080745 A1 | 6/2013 |
| WO | 2013/132947 A1 | 9/2013 |

OTHER PUBLICATIONS

Shin'ichi Goto et al., "Zen Hoi Stereo Gazo ni yoru Nigan Stereo to Motion Stereo o Heiyo shita 3 Jigen Keisoku", ITE Technical Report, Aug. 31, 2010 (Aug. 31, 2010), vol. 34, No. 34, 81 to 84, ME2010-136.

International Search Report, PCT/JP2015/072987, dated Nov. 24, 2015, 2 pgs.

Chinese Office Action dated Jul. 27, 2018 for the Chinese Patent Application No. 201580038805.8.

\* cited by examiner

VEHICLE IMAGE PROCESSING DEVICE FOR ENVIRONMENT RECOGNITION

TECHNICAL FIELD

The present invention relates to an image processing device, for example, an image processing device that processes images captured by plural cameras mounted on a vehicle such as a car to recognize the environment around the vehicle.

BACKGROUND ART

Conventionally, a system that detects, on the basis of an image obtained by a camera (in-vehicle camera) mounted on a vehicle such as a car, vehicles present around the vehicle and utilizes the detection result for driving support for a driver has been developed. As an example of such a system, for example, an inter-vehicle distance keeping system (ACC) that automatically keeps the inter-vehicle distance from a vehicle present around the own vehicle, or a collision avoiding system that warns the driver with an alarm or the like when there is a possibility of collision with a vehicle or the like present around the own vehicle and that reduces the damage to an occupant with automatic braking or the like when the situation reaches the point where collision becomes inevitable is known.

Particularly, in the case of using a stereo camera device including a plurality of cameras, visual information based on images captured by a camera and information about the distance to an object present in the images can be simultaneously obtained, and various objects (such as people, vehicles, three-dimensional objects, the road surface, road markings, and road signs) around the vehicle can be recognized in detail. This is considered to contribute to the improvement of safety in driving support.

While attempt to improve the precision of object detection techniques utilizing image processing that makes up the core of the inter-vehicle distance keeping system and the collision avoiding system has been continued, computation resource that can be utilized by an in-vehicle device is limited, and a quick response speed is also desired. Therefore, in this field, development of technology that meets mutually contradictory requirements such as improvement of detection precision, reduction of computation load, and improvement of response speed is desired.

To meet the desire like this, PTL 1 discloses a technique of measuring a precise distance to an object present in an image by improving the precision of distance in measuring the distance to the object.

An image processing apparatus disclosed in PTL 1 is an apparatus that extracts one-image object region including an image of an object from one of a pair of images obtained by performing image capturing by a pair of image capturing elements at the same time in the same direction, calculates, for each of plural image constituting parts constituting the one-image object region, a background degree that is a degree of certainty indicating whether the image constituting part is an object image constituting part or a background image constituting part, extracts an the-other-image object region that includes an image similar to the one-image object region from the other image by using the background degree, and thereby calculates the parallax between the one-image object region and the the-other-image object region.

CITATION LIST

Patent Literature

PTL 1: JP 2013-104740 A

SUMMARY OF INVENTION

Technical Problem

Figure 7:
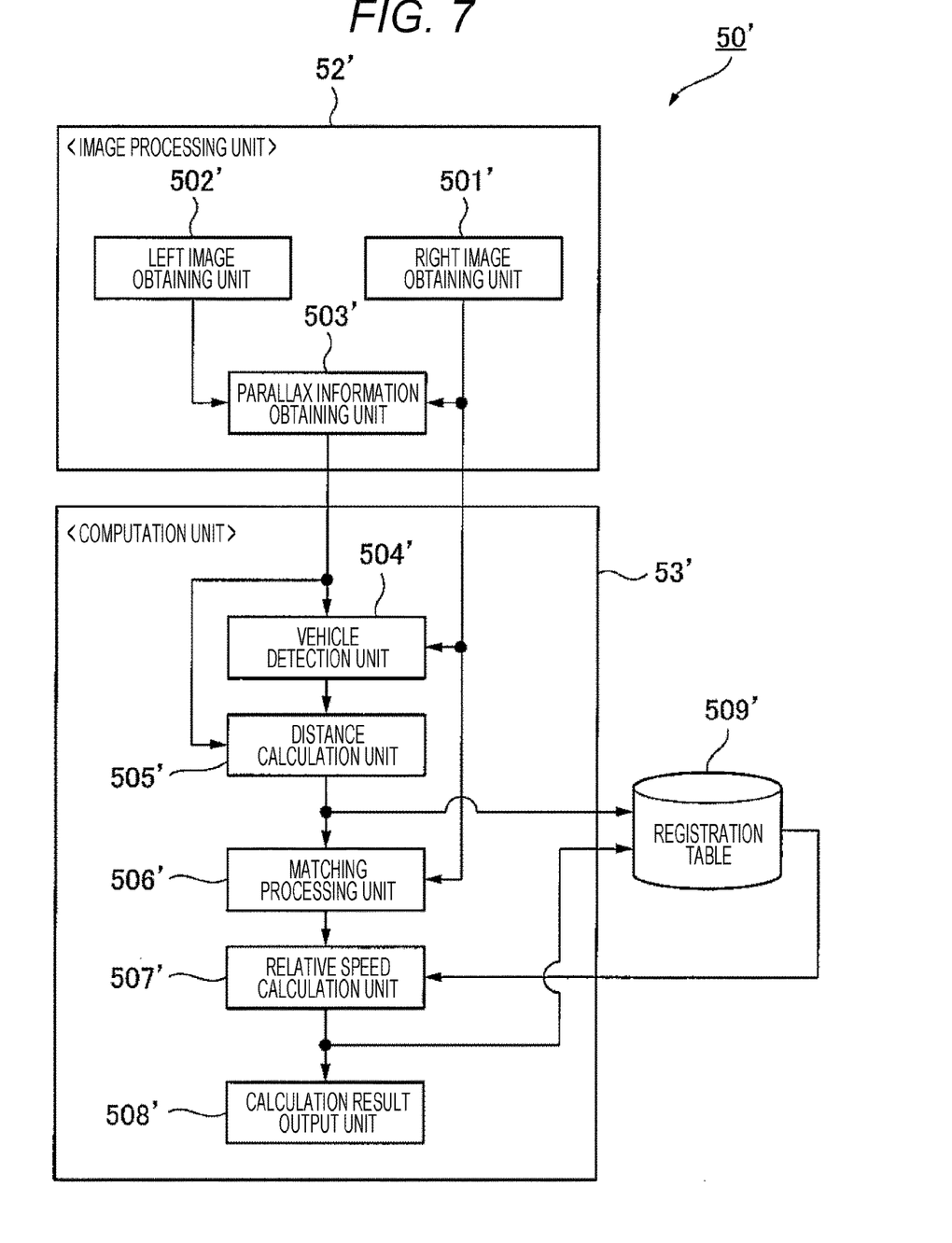
FIG. 7 is an internal configuration diagram illustrating an inner configuration of a conventional image processing device.

By the way, a conventional image processing device used for an object (vehicle in particular) detection technique utilizing a stereo camera device typically has a device configuration illustrated in FIG. 7. That is, as illustrated in FIG. 7, the conventional image processing device 50' mainly includes a right image obtaining unit 501', a left image obtaining unit 502', and a parallax information obtaining unit 503' constituting an image processing unit 52', and a vehicle detection unit 504', a distance calculation unit 505', a matching processing unit 506', a relative speed calculation unit 507', and a calculation result output unit 508' constituting a computation unit 53'.

In the conventional image processing device 50', the left image obtaining unit 502' and the right image obtaining unit 501' first obtain images from a pair of cameras respectively corresponding to left and right mounted on a vehicle. Next, the parallax information obtaining unit 503' matches the two images captured by the left and right cameras with each other to calculate the parallax, and outputs a parallax image. Next, the vehicle detection unit 504' detects and recognizes a vehicle present in the images by using the parallax information (parallax image) obtained from the calculation result and the left and right images (left image and right image captured by the left and right cameras) or one of these images, and outputs positions (positions in the image) of a group of vehicle candidates. Next, the distance calculation unit 505' calculates and outputs the distance to the vehicle (distance to the group of vehicle candidates) by using, for example, the detection result of the vehicle (positions of the group of vehicle candidates) and the parallax information (parallax image). The calculation result is recorded on a registration table 509'. Next, the matching processing unit 506' associates a detection result in one frame with a detection result in a frame following the one frame by using the position information of the vehicle detected between the frames (for example, the positions of and the distance to the group of vehicle candidates in one frame T and a frame T−1 preceding the one frame T) and information about how the images look. In the case where there is no past information, the matching process by the matching processing unit 506' is not performed. Next, the relative speed calculation unit 507' uses the correspondence between the frames (that is, positions of and distance to the group of vehicle candidates associated between the frames) recognized by the matching processing unit 506' to recognize the degree of change in the distance and calculate a relative speed of the vehicle, and records the relative speed derived for the frame on the registration table 509' with the information of the position of and distance to the vehicle. The relative speed can be also derived from an enlargement ratio, and, in this case, one of the right image and the left image may be used. Then, the calculation result output unit 508' outputs the calculation result to a control processing unit or the like. The positions of and distance to the group of vehicle candidates, the relative speed, and the like measured for one frame and recorded on the registration table 509' are used in processing for the next frame.

Figure 8:
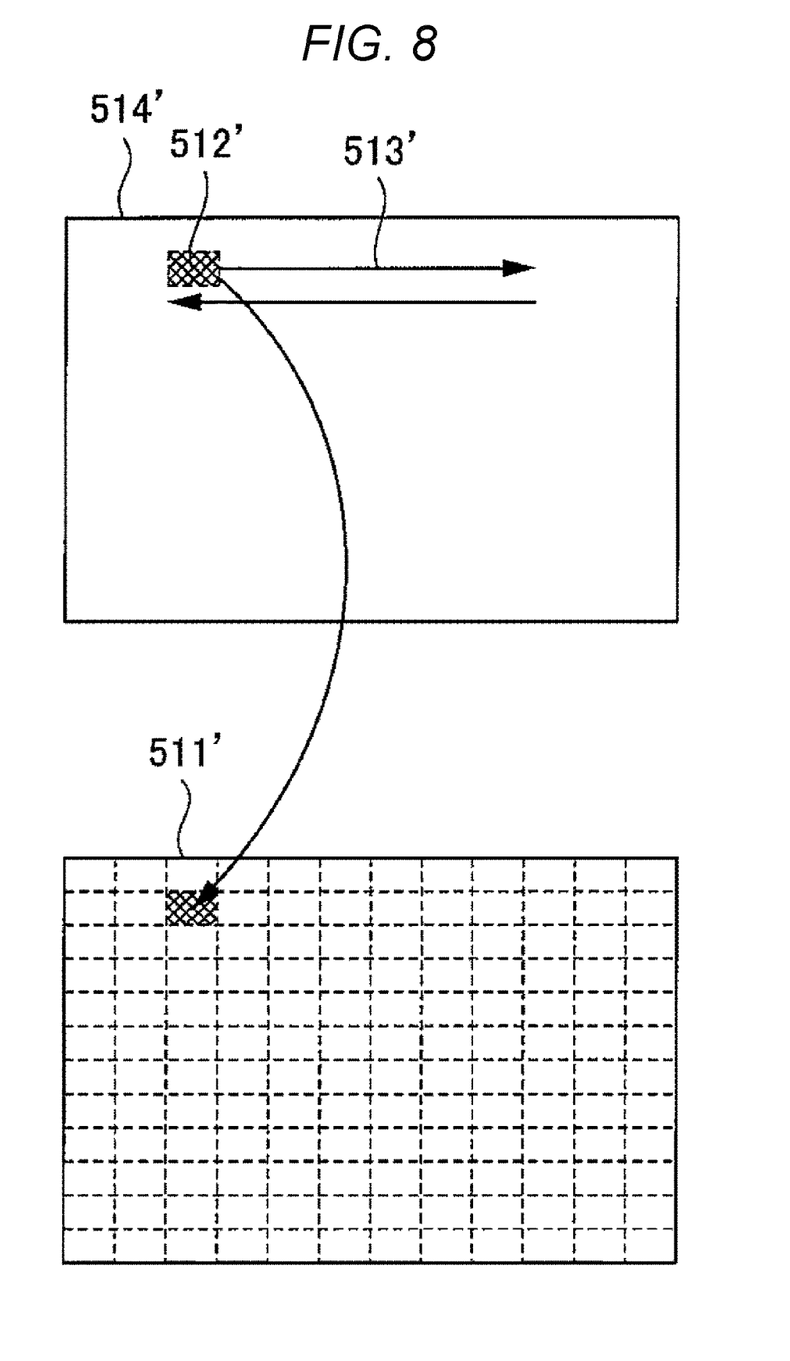
FIG. 8 is a schematic diagram schematically illustrating the details of typical processing by a parallax information obtaining unit.

As illustrated in FIG. 8, in the parallax calculation process by the parallax information obtaining unit 503' described above, in the case where a region 511' and a region 514' are set as target areas in the parallax calculation process for the left and right images, the region 511' is divided into small regions of a certain size, and a part corresponding to a small region to be focused on is searched in the region 514'. Specifically, a region 512' of the same size as the small region to be focused on in the region 511' is cut out from the region 514', the cutout region is shifted in an arrow 513' direction (horizontal direction), and a position that matches the best is searched. The matching region is performed in a predetermined region of mad. However, since the detailed matching of regions described above is performed all over the target images to be viewed in stereo, the processing load becomes large. Although this processing is generally performed by an element that exclusively performs image processing, it is known that the computational load thereof is still large.

Figure 9:
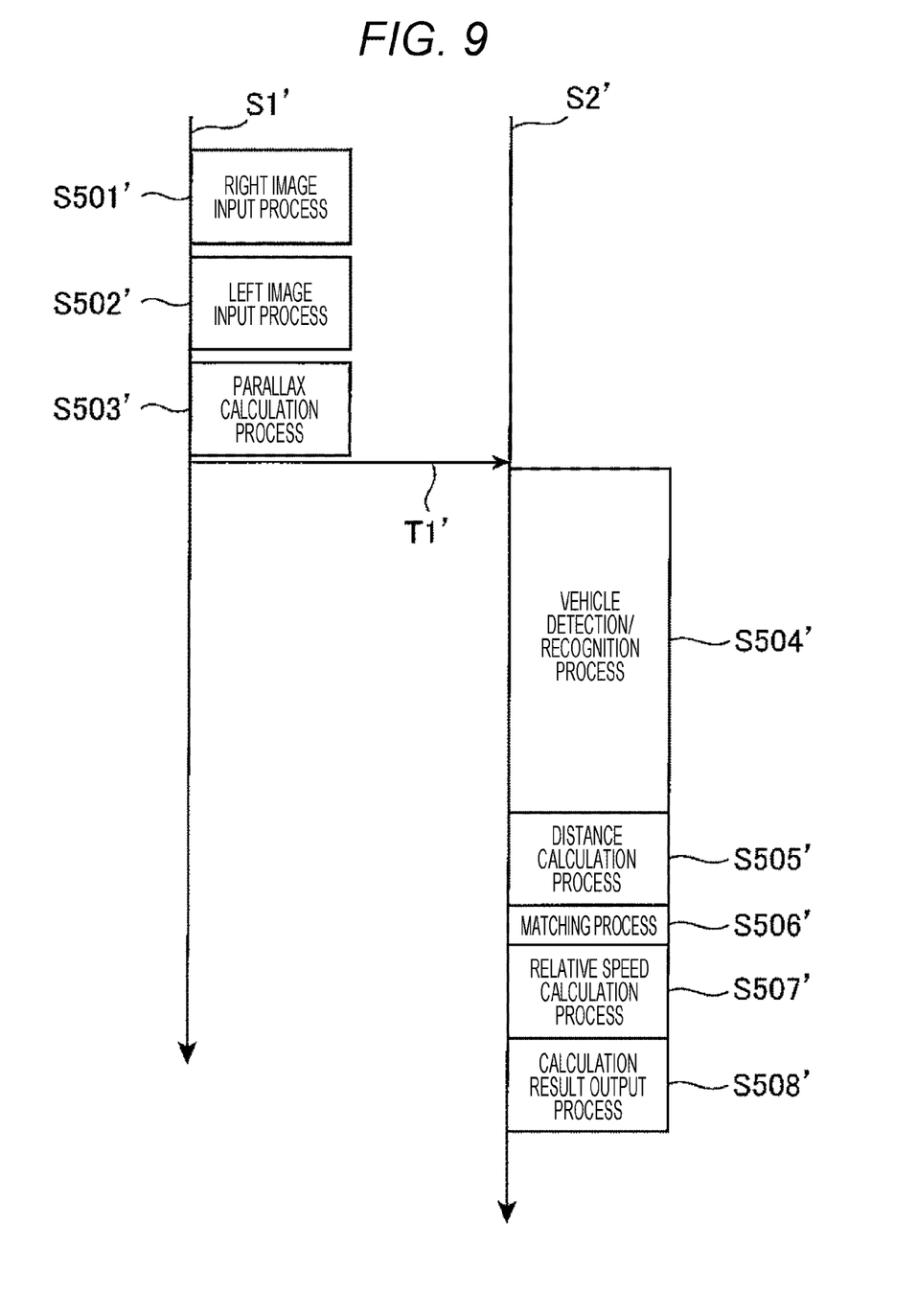
FIG. 9 is a timing chart illustrating the details of processing by the conventional image processing device in temporal order.

To describe the image processing performed by the conventional image processing device 50' in more detail in temporal order, in the case where processes by the image processing unit 52' are referred to as a series S1' and processes by the computation unit 53' are referred to as a series S2', first, in the image processing unit 52' (series S1'), a right image input process S501' from the right camera and a left image input process S502' from the left camera are performed, and a parallax calculation process S503' is performed at a stage where both images are accumulated as illustrated in FIG. 9. As a result of the parallax calculation process S503', the left and right images or one of these images and parallax information (parallax image) corresponding thereto are obtained. The processing result of the parallax calculation process S503' is transferred to the computation unit 53' at a timing T1', and the computation unit 53' (series S2') performs a vehicle detection/recognition process S504' after waiting for completion of the transfer. After that, a distance calculation process S505', a matching process S506', a relative speed calculation process S507', and a calculation result output process S508' are performed.

However, in the conventional image processing device 50' described above, as has been described on the basis of FIG. 8, since time is required for the parallax calculation process S503' performed by the parallax information obtaining unit 503' and also image processing and recognition are frequently used in the vehicle detection/recognition process S504' itself performed by the vehicle detection unit 504', there is a tendency that the overall processing time becomes longer. As a result of this, a problem that the response speed for the calculation result output becomes lower, that is, the response performance deteriorates, can arise.

In addition, the delay of response occurring in a period from image input from a camera to calculation result output is not only when communicating with a vehicle control device by just using a stereo camera device individually, but also in a sensor fusion system that uses a combination with another sensor and provides a vehicle with information about the environment around the vehicle, a problem that the difference in response between sensors becomes larger and integration of information thereof becomes difficult can arise.

The present invention has been made in consideration of the problem described above, and the object thereof is to provide an image processing device that is capable of suppressing delay of response occurring in a period from image input from a camera to calculation result output while keeping the recognition precision of distance or the like, and thereby meet mutually contradictory requirements such as improvement of recognition precision, reduction of computational load (improvement of processing efficiency), and improvement of response speed.

Solution to Problem

To solve the problem described above, an image processing device according to the present invention is an image processing device that measures a relative distance to an object or a relative speed by processing a plurality of images synchronously captured by a plurality of cameras, the object being present in the plurality of images, and the image processing device includes an object pursuing unit that performs a pursuing process for deriving current position information of the object on the basis of one of the plurality of images and past position information of the object, a first distance calculation unit that calculates the relative distance to the object on the basis of the current position information and at least two of the plurality of images, an object detection unit that detects the object by deriving the current position information of the object on the basis of parallax information obtained from at least two of the plurality of images, a second distance calculation unit that calculates the relative distance to the object on the basis of a detection result of the object, and a correction processing unit that corrects at least one of the current position information and the relative distance on the basis of at least one of the current position information derived by the object pursuing unit and the current position information derived by the object detection unit, and the relative distance calculated by the first distance calculation unit and the relative distance calculated by the second distance calculation unit, and a processing start timing of the first distance calculation unit is set to before a processing ending timing of the object detection unit.

Advantageous Effects of Invention

Specifically, according to the present invention, the processing start timing of the first distance calculation unit is set to before the processing ending timing of the object detection unit, particularly to before the processing start timing of the object detection unit, and the delay of response occurring in the period from image input from a camera to calculation result output can be efficiently suppressed while keeping the recognition precision of the distance and the like by calculating the relative distance to the object by using the current position information of the object derived on the basis of any one of the plurality of images and the past position information of the object stored in advance before the ending or the start of an object detection/recognition process by the object detection unit.

Problems, configurations, and advantageous effects other than what has been described above will be revealed in the description of exemplary embodiments below.

DESCRIPTION OF EMBODIMENTS

Exemplary embodiments of an image processing device according to the present invention will be described below with reference to drawings.

[First Exemplary Embodiment]

Figure 1:
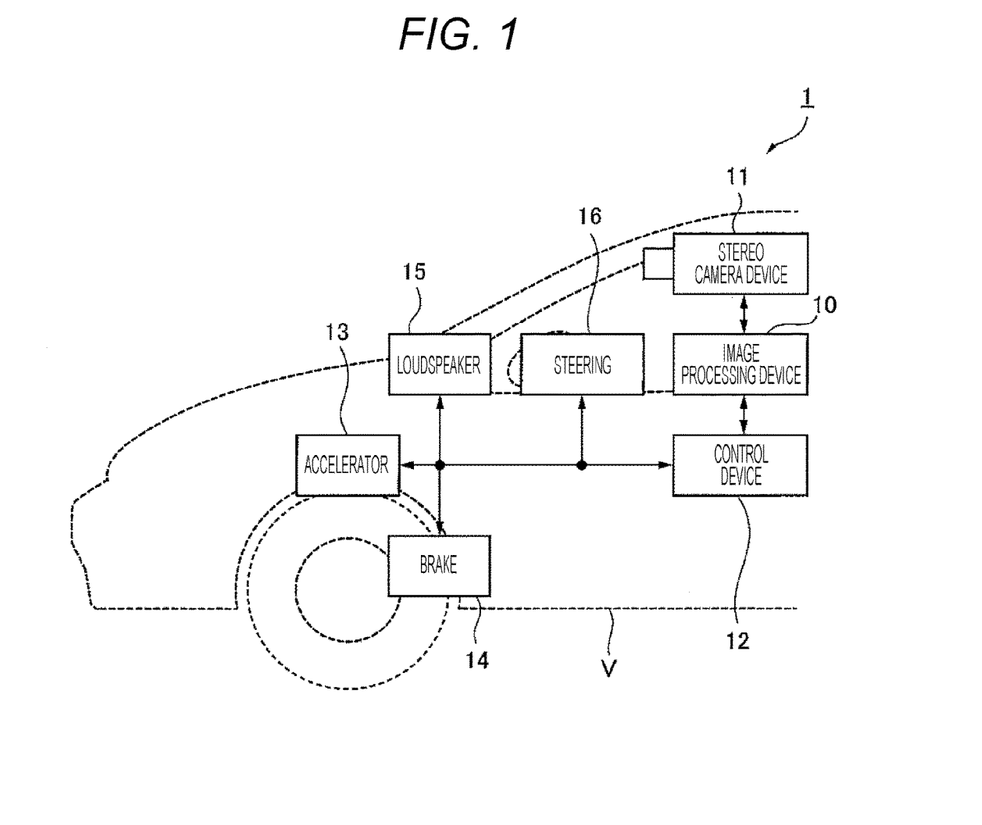
FIG. 1 is a system configuration diagram schematically illustrating a system configuration of a stereo camera system to which a first exemplary embodiment of an image processing device according to the present invention is applied.

FIG. 1 schematically illustrates a system configuration of a stereo camera system to which a first exemplary embodiment of an image processing device according to the present invention is applied. A stereo camera system 1 that is illustrated is, for example, mounted on a vehicle V such as a car, and constituted mainly by a stereo camera device 11 constituted by plural (two in the present exemplary embodiment) cameras, an image processing device 10 that processes plural images synchronously captured by respective cameras of the stereo camera device 11, and a control device 12 that controls various devices (for example, an accelerator 13, a brake 14, a loudspeaker 15, and a steering 16) mounted on the vehicle V on the basis of a control signal generated by the image processing device 10.

The stereo camera device 11 is mounted, for example, on the upper-back of a windshield in the front of the vehicle V so as to head toward the front of the vehicle V, and is communicably connected to the image processing device 10, the control device 12, the accelerator 13, the brake 14, the loudspeaker 15, and so forth. This stereo camera device 11 includes a right camera 11a and a left camera 11b serving as a pair of image capturing means that capture images of the front of the vehicle V to obtain image information. The right camera 11a and the left camera 11b each include an imaging element such as a CCD, and are disposed in positions separated from each other in the width direction (left-to-right direction) of the vehicle so as to capture images of the front of the vehicle V (see FIG. 2).

The image processing device 10 is a device that recognizes the environment outside the vehicle on the basis of the image information of an image-capturing target region in front of the vehicle V obtained in time series by the stereo camera device 11 at a predetermined period. The image processing device 10 recognizes various objects, for example, white lines on roads, pedestrians, vehicles, other three-dimensional objects, traffic lights, signs, and lighting lamps, generates a control signal on the basis of the recognition result, and outputs the control signal to the control device 12. The control device 12 is configured to perform adjustments of the accelerator 13, the brake 14, the steering 16, and so forth of the vehicle V (own vehicle) on the basis of the control signal received from the image processing device 10.

To be noted, the image processing device 10 and the control device 12 may be integrated into the stereo camera device 11 to let the stereo camera device 11 to also perform the processing and may be integrated into an integrating controller or the like.

Figure 2:
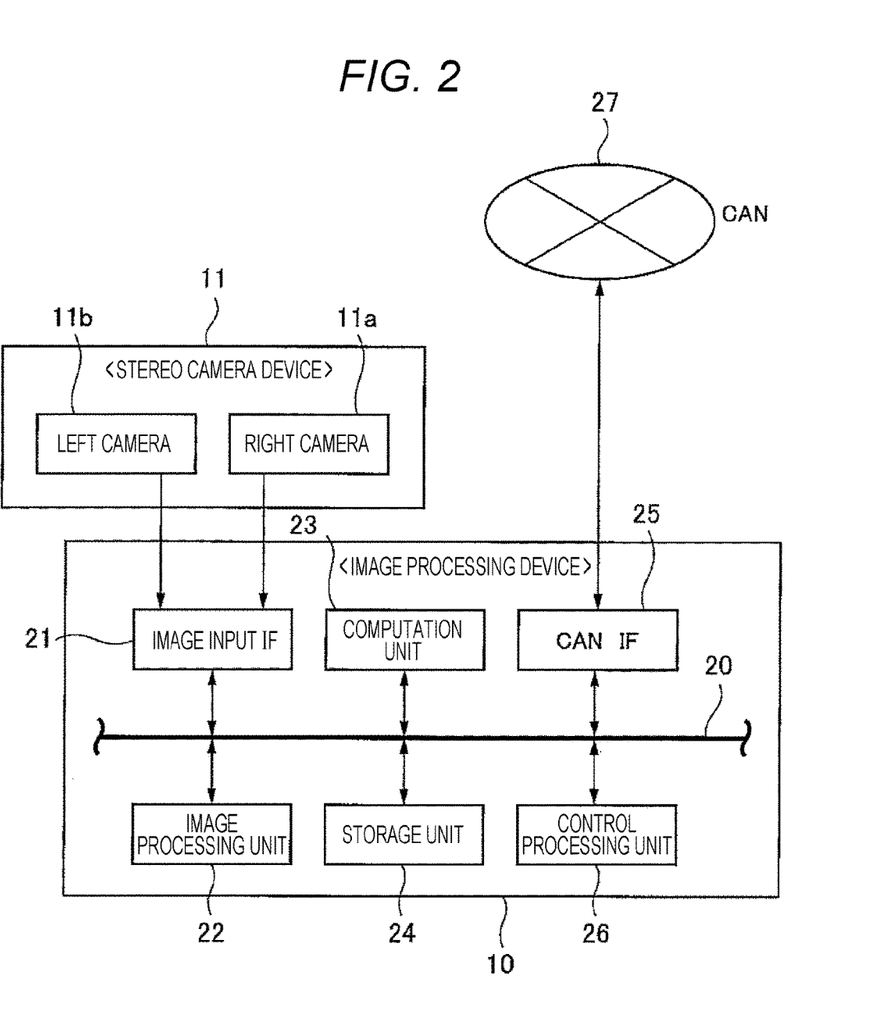
FIG. 2 is an internal configuration diagram schematically illustrating an inner configuration of the image processing device illustrated in FIG. 1.

FIG. 2 schematically illustrates an inner configuration of the image processing device illustrated in FIG. 1. The image processing device 10 that is illustrated mainly includes an image input interface 21, an image processing unit 22, a computation unit 23, a storage unit 24, a CAN interface 25, and a control processing unit 26, and the components are communicably connected via a bus 20.

The image input interface 21 is used for controlling the image capturing of the stereo camera device 11 to import the images captured by (the cameras 11a and 11b of) the stereo camera device 11. The images of the cameras 11a and 11b imported via this image input interface 21 are transferred through the bus 20 and processed by the image processing unit 22 and the computation unit 23, and image data obtained as an intermediate result or the final result of the processing and the like is stored on the storage unit 24.

The image processing unit 22 compares a right image obtained by the image capturing element of the right camera 11a of the stereo camera device 11 with a left image obtained by the image capturing element of the left camera 11b, performs image correction such as correction of deflection unique to the device resulting from the image capturing element, noise interpolation, and the like on respective images, and stores the images on the storage unit 24. In addition to this, the image processing unit 22 calculates portions that mutually correspond between the right image and the left image, generates a parallax image (parallax information) by calculating parallax information, and stores the parallax image on the storage unit 24 as well.

The computation unit 23 uses the images and the parallax information (distance information corresponding to each point in an image) accumulated on the storage unit 24 to perform recognition of various objects necessary for perceiving the environment around the vehicle V. Examples of the various objects include people, vehicles, other obstacles, traffic lights, signs, and taillights and headlights of vehicles. Recognition results of these and a part of intermediate calculation results are stored on the storage unit 24 as well.

The control processing unit 26 generates a control signal for controlling braking and the like of the vehicle V by using the recognition result or the like stored on the storage unit 24, and the control signal related to a control policy of the vehicle V and a part of recognition result of object recognition are transmitted to an in-vehicle network CAN 27 via a CAN interface 25 and transferred from there to the control device 12 or the like.

Figure 3:
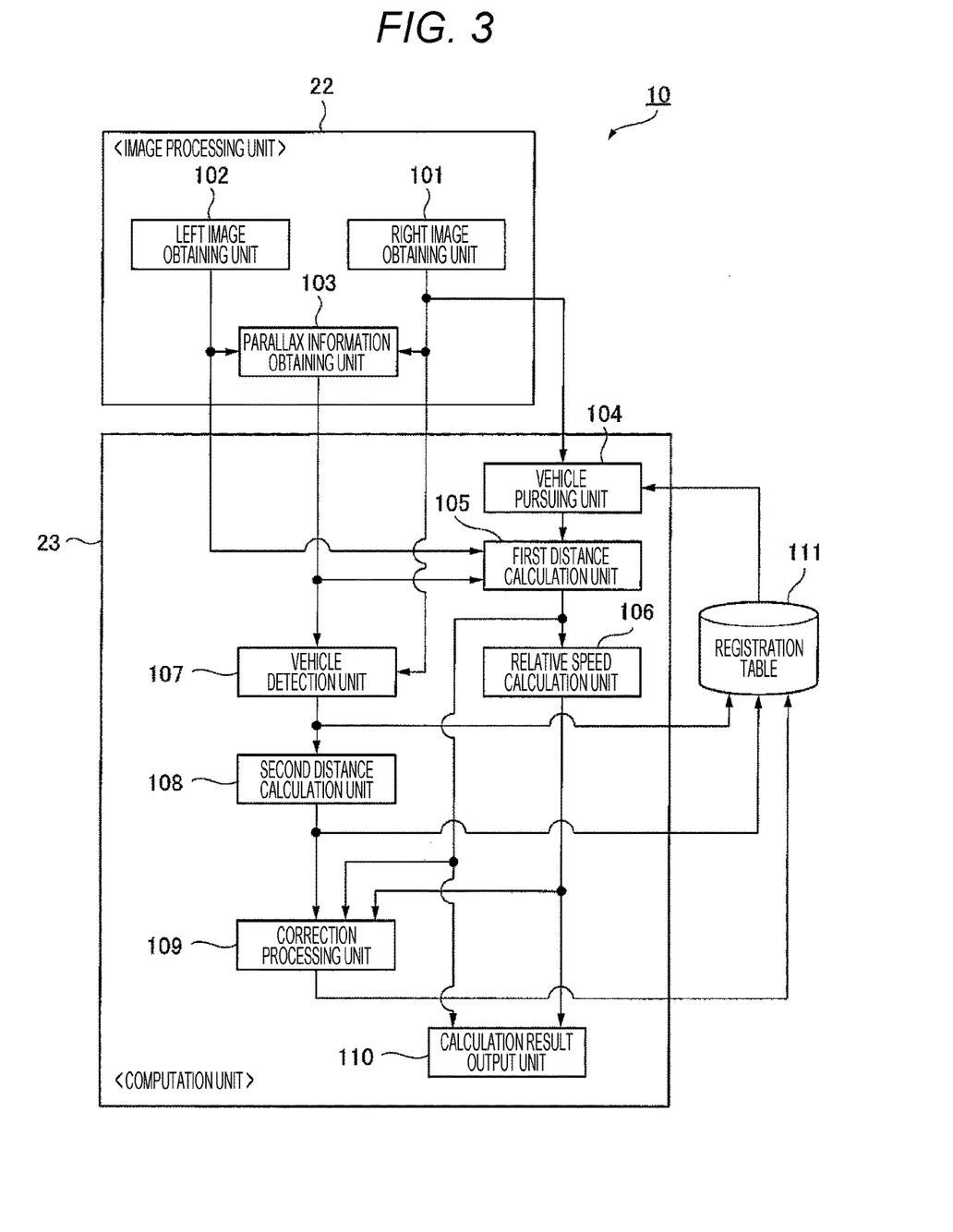
FIG. 3 is an internal configuration diagram illustrating an inner configuration of the image processing device illustrated in FIG. 2.

FIG. 3 illustrates the inner configuration of the image processing device illustrated in FIG. 2 in more detail. The case where the presence of a preceding vehicle in front of the vehicle V is detected as an object and a relative distance from the vehicle V to the preceding vehicle and a relative speed are recognized will be described below in detail.

As illustrated, the image processing device 10 mainly includes a right image obtaining unit 101, a left image obtaining unit 102, and a parallax information obtaining unit 103 constituting an image processing unit 22, and a vehicle pursuing unit 104, a first distance calculation unit 105, a relative speed calculation unit 106, a vehicle detection unit 107, a second distance calculation unit 108, a correction processing unit 109, and a calculation result output unit 110 constituting a computation unit 23.

The details of recognition process (vehicle detection process) by the image processing device 10 differ between the recognition process of the first time and the recognition process of the second time or a time after the second time, and thus the recognition process of the first time and the recognition process of the second time or a time after the second time will be described separately. Here, the recognition process of the first time is a process of performing detection for the first time in a state where a target vehicle has not been detected in the past.

In the recognition process of the first time, first, the right image obtaining unit 101 and the left image obtaining unit 102 obtain a right image and a left image captured by the right camera 11a and the left camera 11b from the storage unit 24. The right image obtaining unit 101 and the left image obtaining unit 102 may obtain the right image and the left image directly from (the cameras 11a and 11b of) the stereo camera device 11 via the image input interface 21. Next, the parallax information obtaining unit 103 calculates parallax by using the right image and the left image obtained by the right image obtaining unit 101 and the left image obtaining unit 102, and thereby generates a parallax image (parallax information). Since images and parallax information (stereo information) are obtained as a result of the calculation of parallax performed by the parallax information obtaining unit 103, the vehicle detection unit 107 derives current position information (position information in the images) of a vehicle present in the images and thereby performs detection/recognition of the vehicle. The second distance calculation unit 108 calculates the distance to the preceding vehicle by using the detection result. The vehicle detection unit 107 and the second distance calculation unit 108 registers the position information and distance information, which are the calculation results, in a registration table 111 serving as the storage unit 24 to use the position information as past position information of the object.

Meanwhile, in the recognition process of the second time or a time after the second time, the vehicle pursuing unit 104 performs, in order to improve the efficiency of the processing and after the right image obtaining unit 101 obtains a right image, a vehicle pursuing process of deriving the current position information (position information in the images) of the preceding vehicle by using the right image and the result that has been already detected and registered in the registration table 111 (that is, past position information of the object). In more detail, the vehicle pursuing unit 104 performs searching in the vicinity of a position included in the already-detected result by using the information of the right image, and thereby specifies the position of the preceding vehicle in the current frame. Next, the first distance calculation unit 105 calculates the distance to the preceding vehicle by using the position information derived by the vehicle pursuing unit 104 and the parallax image (parallax information) generated by the parallax information obtaining unit 103, and the relative speed calculation unit 106 calculates the relative speed of the preceding vehicle by using the calculation result of the first distance calculation unit 105 and a calculation result calculated in the past by the first distance calculation unit 105. Then, the calculation result output unit 110 outputs the calculation result of the first distance calculation unit 105 and the calculation result of the relative speed calculation unit 106 to the control processing unit 26 via the storage unit 24 or the like.

That is, in this recognition process of the second time or a time after the second time, the vehicle pursuing unit 104 does not receive the detection result of the vehicle detection unit 504' of the current frame as the matching processing unit 506' of the conventional image processing device 50' described on the basis of FIG. 7 and FIG. 9 but specifies the position of the object (preceding vehicle) in the current frame in the process by itself from the past information already registered in the registration table 111.

Generally, in the vehicle detection/recognition process by the vehicle detection unit 107, recognition is performed by using a dictionary (picture example dictionary) in which a large number of examples of images of vehicles are registered to recognize pictures of vehicles of various designs in various external environments. Therefore, although a high processing precision is achieved, there is a tendency that the amount of calculation becomes larger and processing time becomes longer. By contrast, in the vehicle pursuing process by the vehicle pursuing unit 104, an image of a vehicle that has been already detected once is used as an example and pursuing is performed in the vicinity thereof. This reduces the amount of calculation and greatly shortens the processing time from input of images to output of calculation results.

After the first distance calculation unit 105 and the relative speed calculation unit 106 perform the distance calculation and the relative speed calculation, as described above, the vehicle detection unit 107 performs detection/recognition of the preceding vehicle by deriving the position of the preceding vehicle in the current frame by using the result of parallax calculation by the parallax information obtaining unit 103, and the second distance calculation unit 108 calculates the distance to the preceding vehicle by using the detection result. Here, since the position of the object (preceding vehicle) in the current frame has already been derived also by the vehicle pursuing unit 104 and the distance to the object (preceding vehicle) has already been derived also by the first distance calculation unit 105, there are results of the vehicle detection unit 107 and the second distance calculation unit 108 and the results of the vehicle pursuing unit 104 and the first distance calculation unit 105. However, these results do not necessarily match. Therefore, the correction processing unit 109 compares the results of the vehicle detection unit 107 and the second distance calculation unit 108 with the results of the vehicle pursuing unit 104 and the first distance calculation unit 105, and determines which position information and distance information are to be used for the next frame. For example, the correction processing unit 109 can use either one piece of information with a higher priority for the next frame or use an internal dividing point of the obtained positions for the next frame. However, how the correction is performed is not particularly limited. In addition, the correction processing unit 109 is also capable of correcting the result obtained by the relative speed calculation unit 106 on the basis of the result of the second distance calculation unit 108 and the result of the first distance calculation unit 105. The correction processing unit 109 stores the derived result (position information, distance information, relative speed information, and the like) on the registration table 111 to use the derived result as the past position information of the object or the like in the vehicle pursuing process or the like in the next frame.

Figure 4:
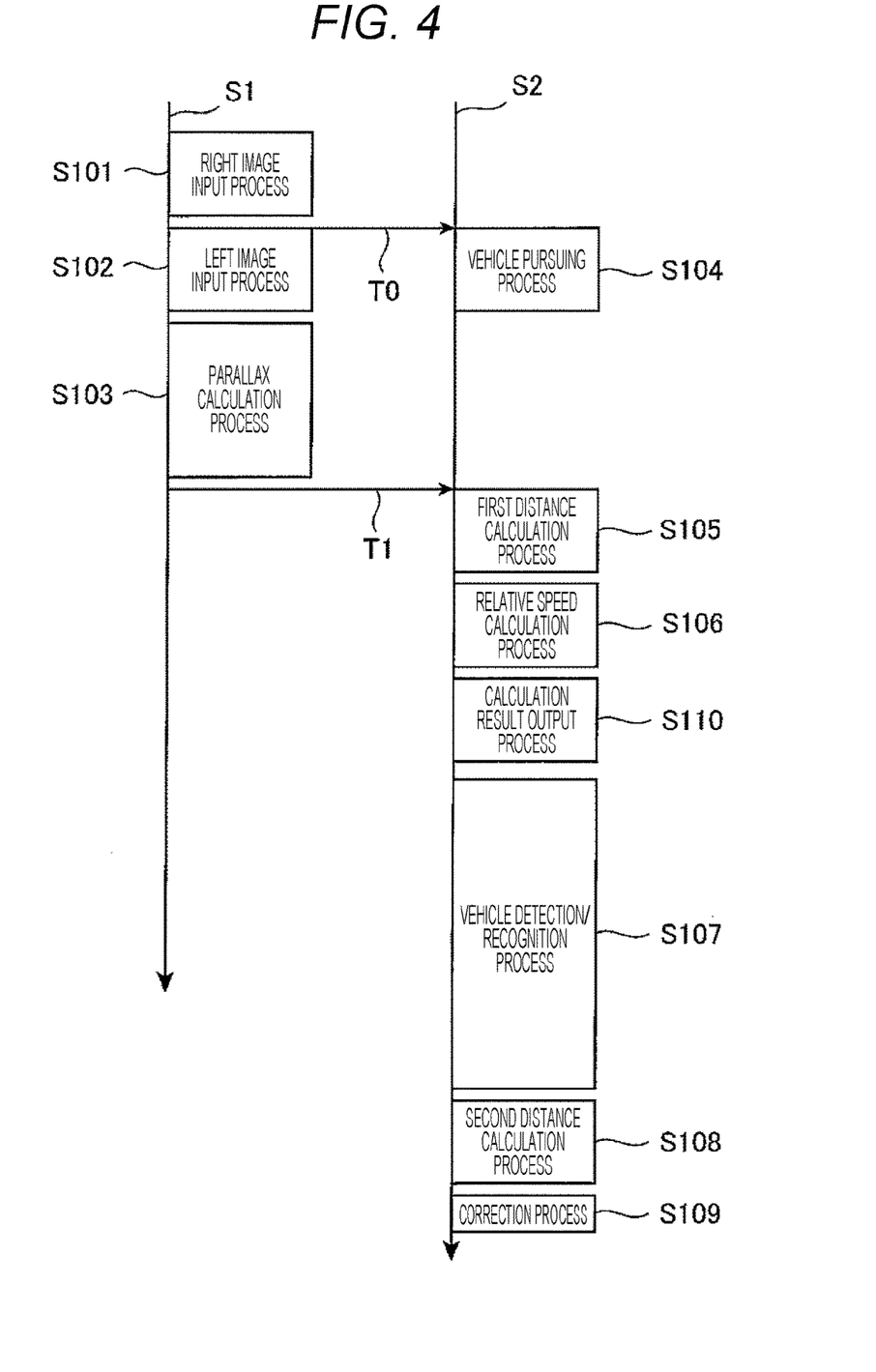
FIG. 4 is a timing chart illustrating the details of processing by the image processing device illustrated in FIG. 1 in temporal order.

To describe the image processing performed by the image processing device 10 in more detail in temporal order, in the case where processes by the image processing unit 22 are referred to as a series S1 and processes by the computation unit 23 are referred to as a series S2, first, in the image processing unit 22 (series S1), a right image input process S101 from the right camera 11a and a left image input process S102 from the left camera 11b are performed, and a parallax calculation process S103 is performed at a stage where both images are accumulated as illustrated in FIG. 4. As a result of the parallax calculation process S103, the left and right images or one of these images and parallax information (parallax image) corresponding thereto are obtained. The processing result of the parallax calculation process S103 is transferred to the computation unit 23 at a timing T1. The process flow up to this step is the same as the process flow of the conventional image processing device 50' described on the basis of FIG. 9.

By contrast, in the present exemplary embodiment, only image data not including stereoscopic data (parallax information) is transferred from the image processing unit 22 (series S1) to the computation unit 23 (series S2) at a timing T0 that is before the timing T1, which is a transfer timing (a timing after a processing ending timing of the parallax calculation process S103) of the processing result of the parallax calculation process S103, and after the finishing of the right image input process S101. Since vehicle pursuit using only images can be performed for a vehicle that has been already detected once, in the computation unit 23 (series S2), a vehicle pursuing process S104 for deriving the position of the vehicle in the current frame is performed while the left image input process S102 and the parallax calculation process S103 are performed in the image processing unit 22 (series S1). Then, a first distance calculation process S105 and a relative speed calculation process S106 are performed by using the parallax information transferred at the timing T1 after the parallax calculation process S103, and a calculation result output process S110 for outputting the calculation results of the first distance calculation process S105 and the relative speed calculation process S106 is performed at this stage. This suppresses the delay occurring in a period from image input to the calculation result output to the control processing unit 26 and the like.

After the calculation results are output in the calculation result output process S110, a vehicle detection/recognition process S107 is performed by using the parallax information, a second distance calculation process S108 for calculating the distance to the preceding vehicle is performed by using the detection result, a correction process S109 for determining the position or the like to be used for the next frame is performed on the basis of the result of the vehicle pursuing process S104 and the like and the result of the vehicle detection/recognition process S107 and the like that have been described above, and the processes for this frame are finished.

As described above, in this first exemplary embodiment, the delay of response in the period from image input to calculation result output can be effectively shortened while keeping the recognition precision of the distance and the like by subdividing the image processing in the image processing device 10 to reconfigure the image processing as divided process flows of a single-camera process flow and a stereoscopic process flow and performing efficient distribution of computational resource such as a CPU.

Specifically, the delay of response occurring in the period from image input from a camera to calculation result output can be efficiently suppressed while keeping the recognition precision of the distance and the like by setting the processing start timing of the vehicle pursuing unit 104 to before the processing ending timing of the parallax information obtaining unit 103, particularly before the processing start timing of the parallax information obtaining unit 103, and the processing start timing of the first distance calculation unit 105 to before the processing ending timing of the vehicle detection unit 107, particularly before the processing start timing of the vehicle detection unit 107, and calculating and outputting the relative distance or the like to the preceding vehicle by using the current position information of the vehicle derived on the basis of either one of the left and right images and the past position information of the vehicle stored in advance on the registration table 111 before the ending or the start of the vehicle detection/recognition process S107 by the vehicle detection unit 107.

[Second Exemplary Embodiment]

Figure 5:
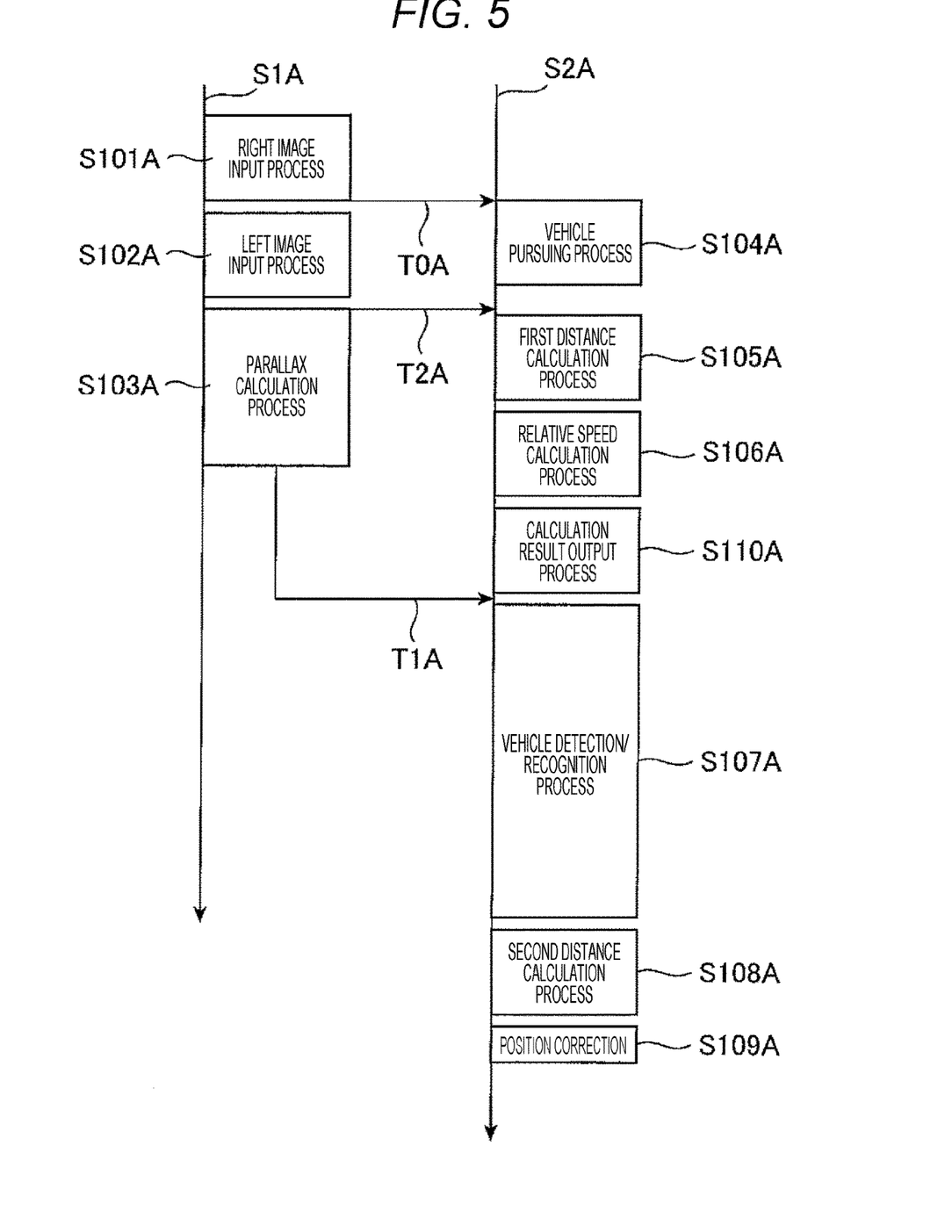
FIG. 5 is a timing chart illustrating the details of processing by a second exemplary embodiment of an image processing device according to the present invention in temporal order.

FIG. 5 illustrates the details of processing by a second exemplary embodiment of an image processing device according to the present invention in temporal order. The image processing device of the second exemplary embodiment differs from the image processing device 10 of the first exemplary embodiment described above mainly in how the distance calculation process is performed by the first distance calculation unit and in the process start/ending timings. That is, the device configuration of the image processing device of the second exemplary embodiment is the same as the device configuration of the image processing device 10 of the first exemplary embodiment. Therefore, the detailed description thereof will be omitted and the details of image processing by the image processing device will be described below in detail.

In the second exemplary embodiment, in the case where processes by the image processing unit 22 are referred to as a series S1A and processes by the computation unit 23 are referred to as a series S2A, first, in the image processing unit 22 (series S1A), a right image input process S101A from the right camera 11a and a left image input process S102A from the left camera 11b are performed, and a parallax calculation process S103A is performed at a stage where both images are accumulated as illustrated in FIG. 5 and similarly to the first exemplary embodiment described above. As a result of the parallax calculation process S103A, the left and right images or one of these images and parallax information (parallax image) corresponding thereto are obtained. The processing result of the parallax calculation process S103A is transferred to the computation unit 23 at a timing T1A.

In addition, only image data (right image) not including stereoscopic data (parallax information) is transferred from the image processing unit 22 (series S1A) to the computation unit 23 (series S2A) at a timing T0A that is before the timing T1A, which is a transfer timing of the processing result of the parallax calculation process S103A, and after the finishing of the right image input process S101A, and a vehicle pursuing process S104A for deriving the position of the vehicle in the current frame is performed.

Further, at a timing T2A after the left image input process S102A is finished, only image data (only the left image or both of the right image and left image) not including parallax information is transferred from the image processing unit 22 (series S1A) to the computation unit 23 (series S2A). Measurement of distance and measurement of relative speed can be performed by restricting the range of calculation in accordance with the same principle as what has been described on the basis of FIG. 8 and can be generally performed in a shorter processing time than in the parallax calculation process S103A if there are the right image and the left image. Therefore, a first distance calculation process S105A and a relative speed calculation process S106A are performed by using the position information derived in the vehicle pursuing process S104A and the right image and left image transferred at the timings T0A and T2A, and then a calculation result output process S110A for outputting the calculation results of the first distance calculation process S105A and the relative speed calculation process S106A is performed. This further shortens the processing time from image input to the calculation result output to the control processing unit 26 and the like.

Then, a vehicle detection/recognition process S107A is performed by using the parallax information of the current frame transferred at a timing T1A after the finishing timing of the parallax calculation process S103A, a second distance calculation process S108A for calculating the distance to the preceding vehicle is performed by using the detection result, and a correction process S109A for determining the position or the like to be used for the next frame is performed on the basis of the result of the vehicle pursuing process S104A and the like and the result of the vehicle detection/recognition process S107A and the like that have been described above.

As described above, in the second exemplary embodiment, the delay of response occurring in the period from image input from a camera to calculation result output can be further reduced while keeping the recognition precision of the distance and the like by setting the processing start timing of the first distance calculation unit to before the processing ending timing of the parallax information obtaining unit, transferring images at a stage of finishing the image input process from each camera before the timing T1A, which is the transfer timing of the processing result of the parallax calculation process S103A, and starting the first distance calculation process S105A and the relative speed calculation process S106A at a stage where the vehicle pursuing process S104A has been finished and the images have been transferred from the cameras before the processing of the parallax calculation process S103A is finished.

[Third Exemplary Embodiment]

Figure 6:
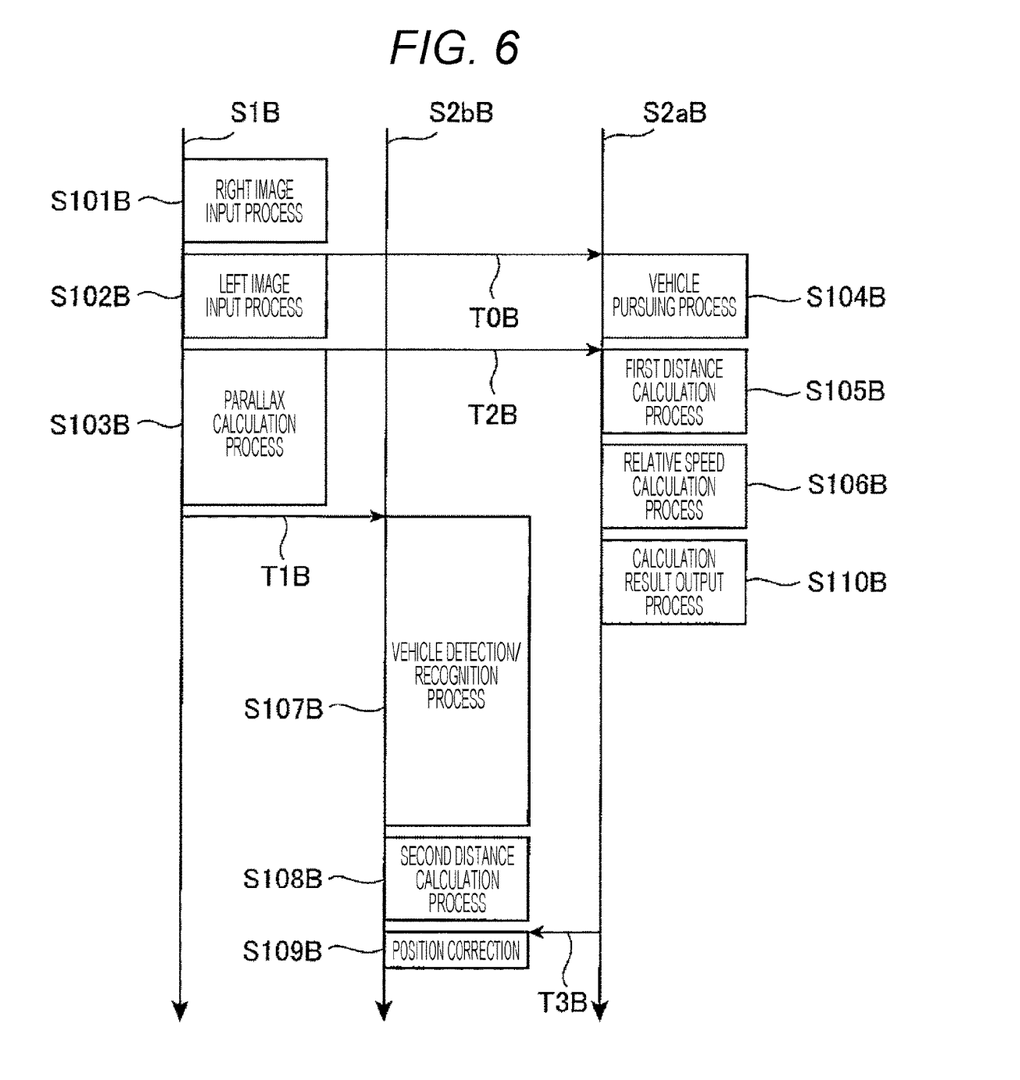
FIG. 6 is a timing chart illustrating the details of processing by a third exemplary embodiment of an image processing device according to the present invention in temporal order.

FIG. 6 illustrates the details of processing by a third exemplary embodiment of an image processing device according to the present invention in temporal order. The image processing device of the third exemplary embodiment differs from the image processing device of the second exemplary embodiment described above mainly in that the computation by the computation unit is performed by using two CPUs. That is, the device configuration of the image processing device of the third exemplary embodiment is the same as the device configuration of the image processing device of the first and second exemplary embodiments. Therefore, the detailed description thereof will be omitted and the details of image processing by the image processing device will be described below in detail.

A vehicle pursuing process and processes related thereto of a single-camera system and a vehicle detection/recognition process and processes related thereto of a stereoscopic system each utilize different data, the vehicle pursuing process does not require stereo information, and the processes are independent from each other. Therefore, the vehicle pursuing process and the like and the vehicle detection/recognition process and the like can be each performed independently by using two CPUs in the computation unit 23.

In the third exemplary embodiment, processes by the image processing unit 22 are referred to as a series S1B and processes by the computation unit 23 are referred to as, assuming use of two CPUs, a series S2aB and a series S2bB performed by the respective CPUs, and first, in the image processing unit 22 (series S1B), aright image input process S101B, a left image input process S102B, and a parallax calculation process S103B are performed as illustrated in FIG. 6 and similarly to the first and second exemplary embodiments described above. Then, at a timing T1B of finishing the parallax calculation process S103B, the processing result (parallax information) is transferred to the series S2bB of the computation unit 23.

Only image data not including parallax information is transferred from the image processing unit 22 (series S1B) to the series S2aB of the computation unit 23 at a timing T0B (timing after obtaining one image) after the right image input process S101B is finished and at a timing T2B (timing after obtaining both images) after the left image input process S102B is finished. In the series S2aB of the computation unit 23, a vehicle pursuing process S104B, a first distance calculation process S105B, a relative speed calculation process S106B, and a calculation result output process S110B are performed. Then, the results of the vehicle pursuing process S104B and the like are transferred from the series S2aB to the series S2bB of the computation unit 23 at an appropriate timing T3B after the calculation result output process S110B is finished.

Meanwhile, in the series S2bB of the computation unit 23, a vehicle detection/recognition process S107B and a second distance calculation process S108B are performed by using the parallax information of the current frame transferred at the timing T1B after the finishing timing of the parallax calculation process S103B. After that, a correction process S109B for determining a position or the like to be used for the next frame is performed on the basis of the results of the vehicle detection/recognition process S107B and the like and the results of the vehicle pursuing process S104B and the like transferred from the series S2aB.

As described above, in the third exemplary embodiment, even in the case where long time is required for the vehicle pursuing process S104B and the like, the processing time from vehicle pursuit to calculation result output becomes longer, and execution of the vehicle detection/recognition process is delayed when only one CPU is used, the vehicle detection/recognition process and the like and the vehicle pursuing process and the like can be performed in parallel by respectively performing the vehicle pursuing process and processes related thereto and the vehicle detection/recognition process and processes related thereto by two respective CPUs in the computation unit 23 and by performing processes of the vehicle pursuing unit, the first distance calculation unit, and the like and processes of an object detection unit, the second distance calculation unit, and the like temporally in parallel. Therefore, the overall processing time of the image processing by the image processing device can be shortened, and the processing efficiency thereof can be effectively improved.

To be noted, although embodiments in which a right image is obtained before obtaining a left image and a vehicle pursuing process is performed by using the right image has been described as the first to third exemplary embodiments, it is needless to say that the left image may be obtained before the right image is obtained and the vehicle pursuing process may be performed by using the left image.

To be noted, the present invention is not limited to the first to third exemplary embodiments described above, and various modification embodiments are included. For example, the first to third exemplary embodiments have been described in detail to describe the present invention in an understandable manner, and the embodiments are not necessarily limited to ones that have all the elements that have been described. In addition, a partial element of one embodiment can be replaced by an element of another embodiment, and an element of another embodiment can be added to the configuration of one embodiment. In addition, with regard to a partial element of an embodiment, addition, deletion, and replacement of another element can be performed.

In addition, control lines and information lines considered as necessary for the description are illustrated, and not necessarily all the control lines and information lines of a product are illustrated. Practically, it can be considered that almost all the elements are mutually connected.

REFERENCE SIGNS LIST 1 stereo camera system
10 image processing device
11 stereo camera device
11a right camera
11b left camera
12 control device
20 bus
21 image input interface 21
22 image processing unit
23 computation unit
24 storage unit
25 CAN interface
26 control processing unit
27 in-vehicle network CAN
101 right image obtaining unit
102 left image obtaining unit
103 parallax information obtaining unit
104 vehicle pursuing unit (object pursuing unit)
105 first distance calculation unit
106 relative speed calculation unit
107 vehicle detection unit (object detection unit)
108 second distance calculation unit
109 correction processing unit
110 calculation result output unit
111 registration table

The invention claimed is:

1. An image processing device that measures a relative distance to an object or a relative speed by processing a plurality of images synchronously captured by a plurality of cameras, the object being present in the plurality of images, the image processing device comprising:
a memory;
at least one CPU, the at least one CPU configured to perform:
an object pursuing process that derives current position information of the object on the basis of one of the plurality of images and past position information of the object;
a first distance calculation that calculates the relative distance to the object on the basis of the current position information and at least two of the plurality of images;
an object detection process that detects the object by deriving the current position information of the object on the basis of parallax information obtained from at least two of the plurality of images;
a second distance calculation that calculates the relative distance to the object on the basis of a detection result of the object; and
a correction process that corrects at least one of the current position information and the relative distance on the basis of at least one of the current position information derived by the object pursuing process and the current position information derived by the object detection process, and the relative distance calculated by the first distance calculation and the relative distance calculated by the second distance calculation,
wherein a processing start time of the first distance calculation is set to be before a processing ending time of the object detection process.

2. The image processing device according to claim 1, wherein the processing start time of the first distance calculation is set to be before a processing start time of the object detection process.

3. The image processing device according to claim 1, wherein the at least one CPU is further configured to perform a calculation result output process that outputs a calculation result of the first distance calculation to an outside.

4. The image processing device according to claim 1, wherein the object pursuing process uses, as the past position information of the object, the at least one of the current position information and the relative distance corrected by the correction process.

5. The image processing device according to claim 1, wherein the at least one CPU is further configured to perform
a parallax information obtaining process that obtains the parallax information from at least two of the plurality of images,
wherein a processing start time of the object pursuing process is set be to before a processing ending time of the parallax information obtaining process.

6. The image processing device according to claim 5, wherein the processing start time of the object pursuing process is set be to before a processing start time of the parallax information obtaining process.

7. The image processing device according to claim 5, wherein the processing start time of the first distance calculation is set be to after the processing ending time of the parallax information obtaining process.

8. The image processing device according to claim 5, wherein the processing start time of the first distance calculation is set be to before the processing ending time of the parallax information obtaining process.

9. The image processing device according to claim 1, wherein processing of the object pursuing process and the first distance calculation and processing of the object detection process and the second distance calculation are performed in parallel.

10. The image processing device according to claim 1, wherein the at least one CPU is further configured to perform a relative speed calculation that calculates the relative speed of the object on the basis of the relative distance calculated from the first distance calculation.

11. The image processing device according to claim 10, wherein the correction process corrects the relative speed of the object on the basis of the relative distance calculated from the first distance calculation and the relative distance calculated from the second distance calculation.

* * * * *